United States Patent Office.

EDWARD T. ATWOOD, OF MINERVA, OHIO.

Letters Patent No. 114,090, dated April 25, 1871.

IMPROVEMENT IN FLUXES FOR REFINING IRON AND STEEL.

The Schedule referred to in these Letters Patent and making part of the same.

*To all whom it may concern:*

Be it known that I, EDWARD T. ATWOOD, of Minerva, in the county of Stark and State of Ohio, have invented or discovered a new and useful improved Compound Flux for Refining Iron and Steel; and I do hereby declare the following to be a full, clear, and exact description of the nature thereof, which will enable others to fully understand, make, and use the same.

In carrying out my discovery or invention, which consists of an admixture of silver ore, which is of a dark-brown color and is obtained in mining for coal, and in its shape resembles "kidney" iron ore, and contains a small per cent. of silver, which silver ore is mixed with borax and manganese, finely divided and thrown in the crucible with the iron.

I take of the ingredients about the following quantity, that is to say—

Of silver ore, which contains a small per cent. of copper, one pound; borax, one ounce; manganese, two ounces.

These ingredients are then ground together and well mixed, when water is added until the mass assumes the consistency of a somewhat thick paste, and is then cut out or made in cakes of a pound size, more or less, as desired, and then dried.

By the presence of the silver, (which contains a small portion of copper,) it is of great value to crucible steel as a flux, as it does not injure or cut the crucible. The borax which is mixed with the silver ore melts or forms a flux at a much lower heat than without it, and, making it a carbon flux, causes the iron to melt sooner than if the plain ore only was used, thus economizing both time and fuel in the production of iron and steel.

Steel made with this improved flux will be found to generate no gases while cooling, and the ingot is free from blow-holes; thus a superior quality of steel, having great tensile strength, is produced.

I am aware of the patent of William Fields, granted May 10th, 1870; such I do not claim; but, Having described my invention,

What I claim, and desire to secure by Letters Patent, is—

A compound flux for refining iron and steel, consisting of silver ore, borax, and manganese mixed together and treated in the manner herein set forth, for the purpose specified.

EDWARD T. ATWOOD.

Witnesses:
C. M. MALIN,
J. F. JERROLD.